US012688477B2

(12) United States Patent

Nakasaka

(10) Patent No.: US 12,688,477 B2
(45) Date of Patent: Jul. 21, 2026

(54) INFORMATION PROCESSING METHOD AND INFORMATION PROCESSING SYSTEM

(71) Applicant: Panasonic Intellectual Property Corporation of America, Torrance, CA (US)

(72) Inventor: Ayaka Nakasaka, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 32 days.

(21) Appl. No.: 18/680,014

(22) Filed: May 31, 2024

(65) Prior Publication Data

US 2024/0320597 A1     Sep. 26, 2024

Related U.S. Application Data

(63) Continuation of application No. PCT/JP2022/030666, filed on Aug. 10, 2022.

(60) Provisional application No. 63/293,223, filed on Dec. 23, 2021.

(51) Int. Cl.
*G06Q 10/0639* (2023.01)
*G06Q 20/38* (2012.01)

(52) U.S. Cl.
CPC ..... *G06Q 10/0639* (2013.01); *G06Q 20/3829* (2013.01)

(58) Field of Classification Search
USPC ...................................................... 705/7.38
See application file for complete search history.

(56) References Cited

U.S. PATENT DOCUMENTS

| | | | |
|---|---|---|---|
| 2012/0296836 A1 | 11/2012 | Hisano | |
| 2019/0057396 A1* | 2/2019 | Cui | G06Q 30/018 |
| 2019/0123580 A1* | 4/2019 | Bindea | H02J 3/14 |
| 2020/0111159 A1* | 4/2020 | Sambhar | G06Q 20/12 |
| 2020/0334751 A1* | 10/2020 | Lagge | G06Q 40/04 |
| 2021/0098988 A1* | 4/2021 | Gokhale | H02J 3/008 |

(Continued)

FOREIGN PATENT DOCUMENTS

| | | |
|---|---|---|
| CN | 111325549 | 6/2020 |
| JP | 2011-164700 | 8/2011 |

OTHER PUBLICATIONS

On the Applicability of Distributed Ledger Architectures to Peer-to-Peer Energy Trading Framework, Besenger et al., IEEE (Year: 2018).*

(Continued)

*Primary Examiner* — Allison M Neal
(74) *Attorney, Agent, or Firm* — Wenderoth, Lind & Ponack, L.L.P.

(57) ABSTRACT

An information processing method executed by an information processing system that manages information related to energy consumption, includes: storing, in a first distributed ledger, first transaction data indicating that first value information obtained by evaluating, based on a first evaluation scale, a first energy consumption by a first user is to be transferred from the first user to a second user; and storing, in a second distributed ledger, second transaction data indicating that second value information obtained by evaluating the first energy consumption based on a second evaluation scale that is different from the first evaluation scale is to be transferred from the second user to the first user.

6 Claims, 11 Drawing Sheets

(56)     References Cited

U.S. PATENT DOCUMENTS

2021/0240858 A1*    8/2021  Tsafack Chetsa  .... H04L 9/3239
2023/0016373 A1*    1/2023  Kasamatsu  .......... G06Q 30/018
2023/0134095 A1*    5/2023  Mitch  ................ G06Q 20/0658
                                            705/51

OTHER PUBLICATIONS

International Search Report (ISR) issued on Nov. 1, 2022 in International (PCT) Application No. PCT/JP2022/030666.

* cited by examiner

FIG. 5

| First user | $CO_2$ emission reduction amount [t] | A |
| --- | --- | --- |
| | Device ID | P0001 |
| | Time period | From January to December, 2020 |

FIG. 6

| Third user | Renewable energy generation amount [kWh] | B |
| --- | --- | --- |
| | Device ID | Q00305 |
| | Time period | From April to June, 2020 |

FIG. 7

| First user | Environmental value | SA |
| --- | --- | --- |
| | Device ID | P0001 |
| | Time period | From January to December, 2020 |
| Third user | Environmental value | SB |
| | Device ID | Q00305 |
| | Time period | From April to June, 2020 |

FIG. 8

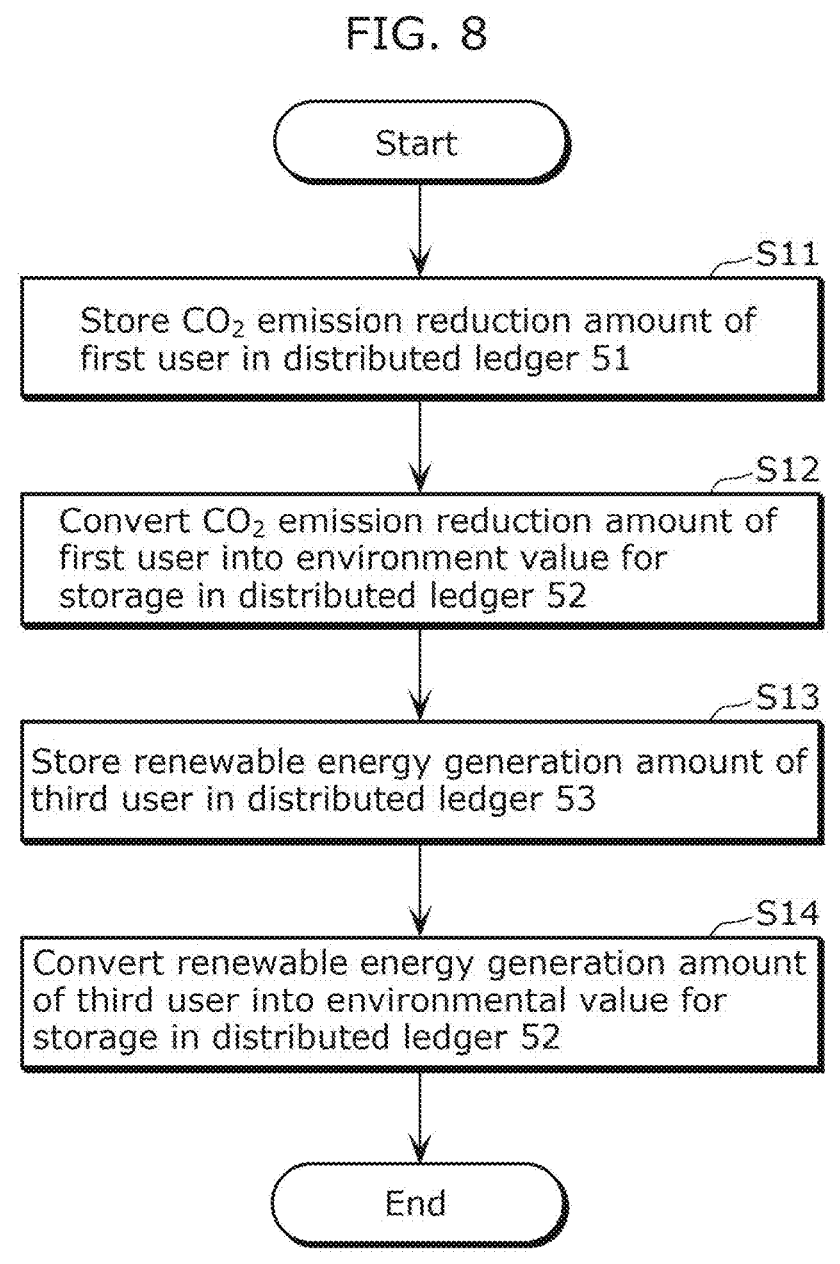

Start

S11

Store $CO_2$ emission reduction amount of first user in distributed ledger 51

S12

Convert $CO_2$ emission reduction amount of first user into environment value for storage in distributed ledger 52

S13

Store renewable energy generation amount of third user in distributed ledger 53

S14

Convert renewable energy generation amount of third user into environmental value for storage in distributed ledger 52

End

FIG. 11

Start

S21

Determine conversion rule by voting

S22

Share conversion rule

End

INFORMATION PROCESSING METHOD AND INFORMATION PROCESSING SYSTEM

CROSS REFERENCE TO RELATED APPLICATIONS

This is a continuation application of PCT International Application No. PCT/JP2022/030666 filed on Aug. 10, 2022, designating the United States of America, which is based on and claims priority of U.S. Provisional Patent Application No. 63/293,223 filed on Dec. 23, 2021. The entire disclosures of the above-identified applications, including the specifications, drawings and claims are incorporated herein by reference in their entirety.

FIELD

The present invention relates to an information processing method and an information processing system.

BACKGROUND

A device for controlling, evaluating or certifying the supply and demand of green power has been disclosed (see Patent Literature (PTL) 1).

CITATION LIST

Patent Literature

PTL 1: Japanese Unexamined Patent Application Publication No. 2011-164700

SUMMARY

Technical Problem

However, the evaluation scale for green power is not limited to one, but there may be multiple evaluation scales. There is a problem in that it is difficult to evaluate green power when there are multiple evaluation scales. It is also useful to include not only electricity but also other types of energies as evaluation targets.

In view of the above, the present disclosure provides an information processing method and the like that appropriately evaluates energy consumption.

Solution to Problem

An information processing method according to one aspect of the present invention is an information processing method executed by an information processing system that manages information related to energy consumption. The information processing method includes: storing first transaction data in a first distributed ledger, the first transaction data indicating that first value information is to be transferred from a first user to a second user, the first value information being obtained by evaluating, based on a first evaluation scale, a first energy consumption by the first user; and storing second transaction data in a second distributed ledger, the second transaction data indicating that second value information is to be transferred from the second user to the first user, the second value information being obtained by evaluating the first energy consumption based on a second evaluation scale that is different from the first evaluation scale.

The general and specific aspects described above may be realized using a system, a device, an integrated circuit, a computer program, or a computer-readable recording medium such as a CD-ROM, or in any combination of systems, devices, integrated circuits, computer programs and recording media.

Advantageous Effects

The information processing method according to the present disclosure is capable of appropriately evaluating energy consumption.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5 is an explanatory diagram illustrating a first example of value information according to the embodiment.

FIG. 6 is an explanatory diagram illustrating a second example of value information according to the embodiment.

FIG. 7 is an explanatory diagram illustrating a third example of value information according to the embodiment.

FIG. 8 is a first flow diagram illustrating processes executed by the information processing system according to the embodiment.

FIG. 11 is a second flow diagram illustrating processes executed by the information processing system according to the embodiment.

DESCRIPTION OF EMBODIMENT

Figure 1:
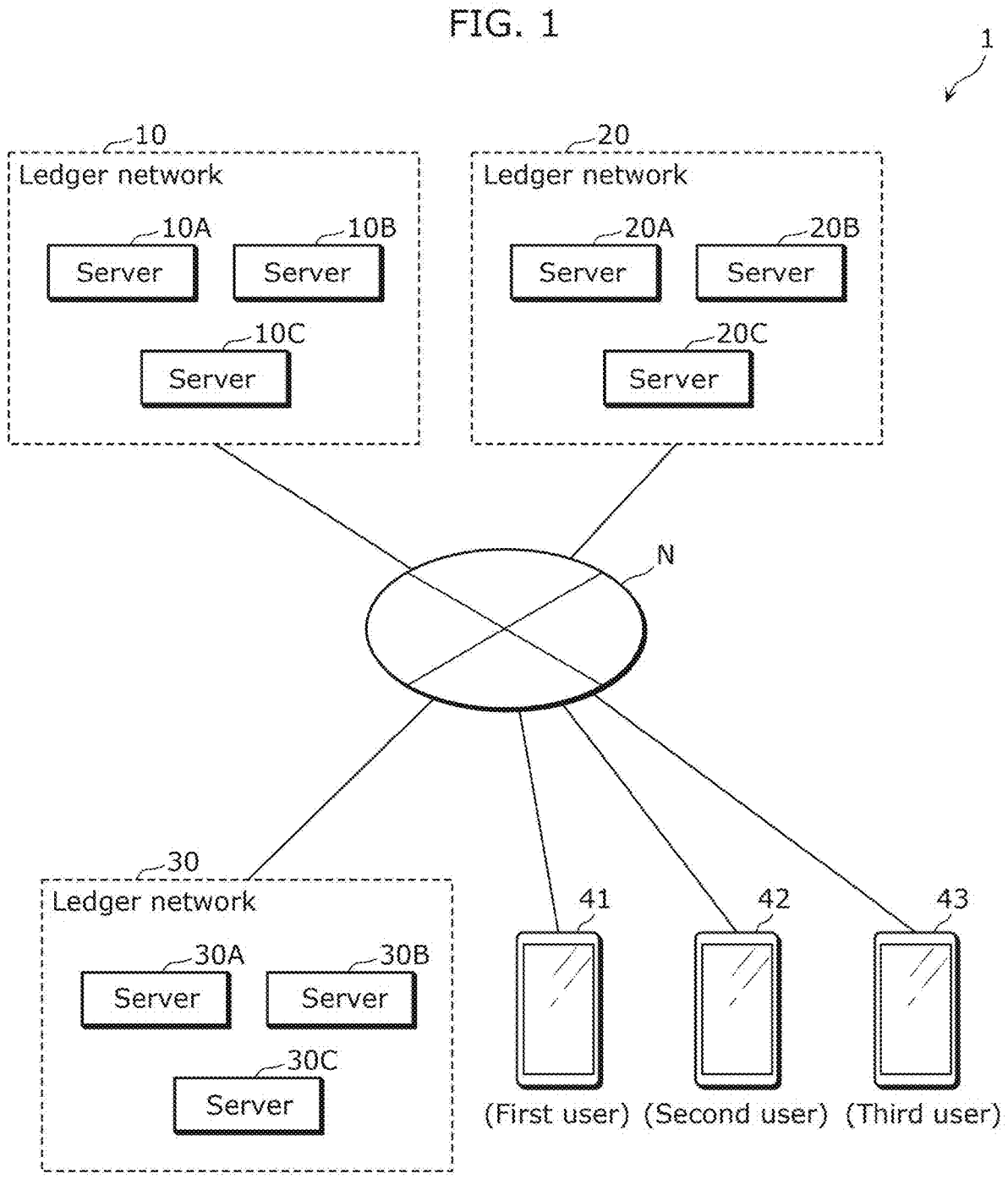
FIG. 1 schematically illustrates a configuration of an information processing system according to an embodiment.

Underlying Knowledge Forming Basis of the Present Disclosure

The inventors of the present disclosure have found that the following problems arise in relation to the technique related to green power described in the "Background" section.

The evaluation scale for green power is not limited to one, but there may be multiple evaluation scales. Examples of systems or mechanisms for evaluating and certifying green power include J-credits, green power certificates, and non-fossil certificates. For example, in J-credits, the amount of $CO_2$ (carbon dioxide) emission reduction (hereinafter, referred to as $CO_2$ emission reduction amount) can be used as a scale for evaluating energy consumption. In addition, in green power certificates or non-fossil certificates, the amount of electricity generated using renewable energy (also referred to as "renewable energy generation amount") can be used as a scale for evaluating energy consumption.

As described above, there is a problem in that it is difficult to evaluate green power when there are multiple evaluation scales. For example, it is difficult to simply compare value information evaluated based on different evaluation scales (e.g., simply comparing $CO_2$ emission reduction amount with renewable energy generation amount).

In view of the above, the present disclosure provides an information processing method and the like that appropriately evaluates energy consumption.

Hereinafter, an invention obtained from the disclosure of the specification will be exemplified, and the advantageous effects, etc. obtained from the invention will be described.

(1) An information processing method executed by an information processing system that manages information related to energy consumption, includes: storing first transaction data in a first distributed ledger, the first transaction data indicating that first value information is to be transferred from a first user to a second user, the first value information being obtained by evaluating, based on a first evaluation scale, a first energy consumption by the first user; and storing second transaction data in a second distributed ledger, the second transaction data indicating that second value information is to be transferred from the second user to the first user, the second value information being obtained by evaluating the first energy consumption based on a second evaluation scale that is different from the first evaluation scale.

With the above aspect, the information processing system is capable of managing, in a distributed ledger, information related to first energy consumption by a first user. The information processing system is also capable of managing, in another distributed ledger, the first energy consumption as value information (second value information) obtained by evaluating first energy consumption based on an evaluation scale different from the original evaluation scale of the value information (first value information). In other words, the information processing system is capable of managing the first energy consumption in a distributed ledger while converting the evaluation scale of the first energy consumption. First, in the information processing system according to the above aspect, information is transmitted to and received from between a distributed ledger that manages information based on an evaluation scale before the conversion, and a distributed ledger that manages the information based on an evaluation scale after the conversion. In this way, information related to the first energy consumption is exchanged and managed, so that it is possible to prevent the information related to the first energy consumption from being tampered with while the information related to the first energy consumption is known publicly. Moreover, if it is not possible to convert the evaluation scale of the first energy consumption, it is difficult to compare value information evaluated based on different evaluation scales. This leads to less utilization of the value information. As a result, for example, such a case can happen where energy consumption is not appropriately evaluated. The information processing system according to the above aspect is capable of converting the evaluation scale of the first energy consumption, so that energy consumption can be appropriately evaluated. In such a manner, the information processing system according to the above aspect is capable of appropriately evaluating energy consumption.

(2) The information processing method according to (1), wherein, in the storing of the second transaction data, when the second transaction data is stored, whether an other item of transaction data has already been stored in the second distributed ledger is determined, the other item of transaction data indicating a transfer of the second value information of the first energy consumption to which the second transaction data to be stored is related, and when determining that the other item of transaction data has already been stored in the second distributed ledger, the second transaction data is prevented from being stored in the second distributed ledger.

With the above aspect, when the evaluation scale of the first energy consumption is converted, it is possible to prevent the same first energy consumption from being managed in duplicate. In other words, duplicate management of the energy consumption can be prevented. If the same first energy consumption is managed based on different evaluation scales by different ways, the same first energy consumption can be managed in duplicate. Therefore, the information processing system according to the above aspect is capable of more appropriately evaluating the energy consumption while preventing the energy consumption from being managed in duplicate. Since the energy consumption is prevented from being managed in duplicate, memory consumption can be reduced.

(3) The information processing method according to (1) or (2), wherein, in the storing of the first transaction data, the first transaction data is stored in the first distributed ledger in a confidential state, the first transaction data includes a program code for removing the confidential state of the first transaction data using predetermined key information, in the storing of the second transaction data, the second transaction data is stored in the second distributed ledger in a confidential state, the second transaction data includes a program code for removing the confidential state of the second transaction data using the predetermined key information, and the information processing method comprises: removing the confidential state of the second transaction data by storing third transaction data including the predetermined key information in the second distributed ledger; and removing the confidential state of the first transaction data by storing fourth transaction data including the predetermined key information in the first distributed ledger.

With the above aspect, when converting the evaluation scale of the first energy consumption, information is transmitted and received in a confidential state between the distributed ledger that manages the evaluation scale before the conversion and the distributed ledger that manages the evaluation scale after the conversion, and then the confidential state is removed using key information. This prevents unauthorized gain or loss of evaluation information, for example, when information transfer is aborted in the middle of the process. Therefore, the information processing system according to the above aspect is capable of more appropriately evaluating energy consumption while preventing the occurrence of fraud concerning the conversion of information related to energy consumption.

(4) The information processing method according to any one of (1) to (3), further includes: storing fifth transaction data in a third distributed ledger, the fifth transaction data indicating that third value information is to be transferred from a third user to the second user, the third value information being obtained by evaluating, based on a third evaluation scale, a second energy consumption by the third user, the third evaluation scale being different from the first evaluation scale and the second evaluation scale; and storing sixth transaction data in the second distributed ledger, the sixth transaction data indicating that fourth value information is to be transferred from the second user to the third user, the fourth value information being obtained by evaluating the second energy consumption based on the second evaluation scale.

With the above aspect, the information processing system is capable of managing, in a distributed ledger, information related to second energy consumption by a third user. The information processing system is also capable of managing the second energy consumption in a separate distributed ledger as value information (second value information) obtained by evaluating the second energy consumption based on an evaluation scale different from that of the original value information (third value information). In other words, the information processing system is capable of managing the second energy consumption in a distributed ledger, in common with the first energy consumption, while converting the evaluation scale of the second energy consumption. This allows the first energy consumption and the second energy consumption to be evaluated based on a common evaluation scale, so that the evaluation of energy consumption can be made appropriately. In such a manner, the information processing system according to the above aspect is capable of more appropriately evaluating energy consumption.

(5) The information processing method according to any one of (1) to (4), wherein the second value information is equivalent to the first value information.

According to the above aspect, the first value information related to the first energy consumption can be easily converted into the second value information, which is equivalent to the first value information, and managed in a distributed ledger. Accordingly, the information processing system according to the above aspect is capable of more easily and appropriately evaluating energy consumption.

(6) The information processing method according to any one of (1) to (4), wherein the second value information is obtained by multiplying the first value information by a conversion rate.

According to the above aspect, the first value information related to the first energy consumption can be easily converted into the second value information obtained by multiplying the first value information by a conversion rate, and managed in a distributed ledger. Accordingly, the information processing system according to the above aspect is capable of more easily and appropriately evaluating energy consumption.

(7) The information processing method according to any one of (1) to (6), wherein the first distributed ledger is a private distributed ledger, and the second distributed ledger is a public distributed ledger.

According to the above aspect, a private distributed ledger is used as the first distributed ledger and a public distributed ledger is used as the second distributed ledger. The information stored in a private distributed ledger can only be viewed by limited users, while the information stored in a public distributed ledger can be viewed by any user connected to the Internet. In this situation, in order for the information related to the first energy consumption to be referenced by a larger number of users, it is advantageous for the first user to change the distributed ledger in which the information related to the first energy consumption is stored from the first distributed ledger to the second distributed ledger. This increases the motivation of the first user to convert from the first value information to the second value information, and contributes to facilitating the conversion from the first value information to the second value information. This will further facilitate the appropriateness of evaluations on energy consumption. Accordingly, the information processing system according to the above aspect is capable of more appropriately evaluating energy consumption.

(8) The information processing method according to any one of (1) to (7), wherein the first value information is information indicating a $CO_2$ emission reduction amount related to the first energy consumption or a renewable energy generation amount related to the first energy consumption, and the second value information is information obtained by evaluating the first energy consumption based on a standard evaluation scale related to energy consumption.

With the above aspect, the information processing system is capable of managing, in a distributed ledger, information indicating $CO_2$ emission reduction amount or renewable energy generation amount for the first energy consumption by the first user, converting the first energy consumption into information obtained by evaluating the first energy consumption based on a standard evaluation scale, and managing the first energy consumption after the conversion in another distributed ledger. With this, the information processing system is capable of allowing information obtained by evaluating the first energy consumption based on the standard evaluation scale to be known publicly, and managing the information while preventing the information from being tampered with. Accordingly, the information processing system according to the above aspect is capable of more appropriately evaluating energy consumption.

(9) An information processing system that manages information related to energy consumption, includes: storing first transaction data in a first distributed ledger, the first transaction data indicating that first value information is to be transferred from a first user to a second user, the first value information being obtained by evaluating, based on a first evaluation scale, a first energy consumption by the first user; and storing second transaction data in a second distributed ledger, the second transaction data indicating that second value information is to be transferred from the second user to the first user, the second value information being obtained by evaluating the first energy consumption based on a second evaluation scale that is different from the first evaluation scale.

With the above aspect, the same advantageous effects as those of the information processing system described above can be obtained.

These general and specific aspects may be implemented using a system, a device, an integrated circuit, a computer program, or a computer-readable recording medium such as a CD-ROM, or any combination of systems, devices, integrated circuits, computer programs, or computer-readable recording media.

Hereinafter, an exemplary embodiment will be described in details with reference to the accompanying drawings.

The exemplary embodiment described below shows a general or specific example. The numerical values, shapes, materials, elements, the arrangement and connection of the elements, steps, the processing order of the steps etc. shown in the following exemplary embodiment are mere examples, and therefore do not limit the present disclosure. Among the elements in the following exemplary embodiment, those not recited in any one of the independent claims defining the most generic concept are described as optional elements.

Embodiment

In the present embodiment, an information processing method and the like that appropriately evaluates energy consumption will be described.

FIG. 1 schematically illustrates a configuration of information processing system 1 according to the present embodiment.

As illustrated in FIG. 1, information processing system 1 includes ledger networks 10, 20, and 30. Ledger networks 10, 20, and 30 are directly or indirectly connected to network N, and are capable of communicating with one other via network N.

Information processing system 1 is also connected to terminals 41, 42 or 43 via network N. Terminals 41, 42 or 43 may or may not be included in information processing system 1.

Network N may include any communication line or network, and may include, for example, the Internet, a cellular carrier network, an Internet provider's access network, or a public access network.

Ledger network 10 is a peer-to-peer (P2P) network that stores and manages a distributed ledger. The distributed ledger managed by ledger network 10 is a distributed ledger for managing value information obtained by evaluating energy consumption based on a first evaluation scale. The distributed ledger managed by ledger network 10 can be a private distributed ledger. The first evaluation scale is, for example, $CO_2$ emission reduction amount, and this case will be described as an example.

Ledger network 10 includes servers 10A, 10B, and 10C (also referred to as servers 10A, etc.) as nodes in a P2P network. Servers 10A, etc. will be described in more detail later. The number of servers 10A, etc. included in ledger network 10 is not limited to three, but may be more than three.

Ledger network 20 is a P2P network that stores and manages a distributed ledger. The distributed ledger managed by ledger network 20 is a distributed ledger for managing value information obtained by evaluating energy consumption based on a second evaluation scale. The second evaluation scale is different from the first evaluation scale. The distributed ledger managed by ledger network 20 can be a public distributed ledger. The second evaluation scale is, for example, a standard evaluation scale for energy consumption (also referred to as a standard evaluation scale). This case will be described as an example.

Ledger network 20 includes servers 20A, 20B, and 20C (also referred to as servers 20A, etc.) as nodes in a P2P network. Servers 20A, etc. will be described in more detail later. The number of servers 20A, etc. included in ledger network 20 is not limited to three, but may be more than three.

Ledger network 30 is a P2P network that stores and manages a distributed ledger. The distributed ledger managed by ledger network 30 is a distributed ledger for managing value information obtained by evaluating energy consumption based on a third evaluation scale. The third evaluation scale is different from the first evaluation scale and the second evaluation scale. The distributed ledger managed by ledger network 30 can be a private distributed ledger. The third evaluation scale is, for example, renewable energy generation amount. This case will be described as an example.

Ledger network 30 includes servers 30A, 30B, and 30C (also referred to as servers 30A, etc.) as nodes in a P2P network. Servers 30A, etc. will be described in more detail later. The number of servers 30A etc. included in ledger network 30 is not limited to three, but may be more than three.

Terminal 41 is a terminal used by a first user who evaluates energy consumption based on a $CO_2$ emission reduction amount, and operates in response to an operation made by the first user. Terminal 41 generates transaction data to be stored in a distributed ledger. The first user may be, for example, but not limited to, a company, but may be a group of one or more persons or an organization to which one or more persons belong. Terminal 41 stores value information related to the energy consumption by the first user in the distributed ledger managed by ledger network 10. In addition, terminal 41 operates in cooperation with terminal 42 to convert value information related to the energy consumption by the first user into value information (also referred to as environmental value) obtained by evaluating, based on a standard evaluation scale, the energy consumption by the first user.

Terminal 42 is a terminal used by a second user who manages the standard evaluation scale, and operates in response to an operation made by the second user. Terminal 42 operates in cooperation with terminal 41 to convert the value information related to the energy consumption by the first user into an environmental value. At this time, terminal 42 may convert the value information related to the energy consumption by the first user into an environmental value equivalent to the value information (see (Equation 1)). In this case, the environmental value is equivalent to the value information related the energy consumption by the first user.

$$\text{Environmental value} = \qquad\qquad \text{(Equation 1)}$$
$$C \times (\text{value information related to energy}$$
$$\text{consumption by first user)}$$

In (Equation 1), C is a constant for converting the value information related to the energy consumption by the first user into an environmental value equivalent to the value information. For example, C is a constant for converting the unit of the value information to the unit of the environmental value.

Terminal 42 may also convert the value information related to the energy consumption by the first user into an environmental value by multiplying the value information by a predetermined conversion rate (see (Equation 2)). In this case, the environmental value is a value obtained by multiplying the value information related to the energy consumption by the first user by a predetermined conversion rate.

$$\text{Environmental value} = \qquad\qquad \text{(Equation 2)}$$
$$R \times C \times (\text{value information related to energy}$$
$$\text{consumption by first user)}$$

In (Equation 2), R denotes a predetermined conversion rate. For example, R may be set to a value smaller than 1 when the measurement accuracy of the value information related to the energy consumption by the first user is relatively low, or when the standard of the value information related to the energy consumption by the first user is relatively old. It can also be said that (Equation 1) is equivalent to the case where R is set to 1 in (Equation 2).

In addition, terminal 42 operates in cooperation with terminal 43 to convert value information related to the energy consumption by a third user into value information obtained by evaluating, based on a standard evaluation scale, the energy consumption by the third user. The value information obtained by evaluating the value information related to the energy consumption by the third user based on a standard evaluation scale may be equivalent to the value information related to the energy consumption by the first user as in the case of the first user, or may be a value obtained by multiplying the value information related to the energy consumption by the third user by a predetermined conversion rate.

Terminal 43 is a terminal used by the third user who evaluates energy consumption based on the renewable energy generation amount, and operates in response to an operation made by the third user. Terminal 43 is a terminal device that generates transaction data to be stored in a distributed ledger. The third user may be, for example, but not limited to, a company, but may be a group of one or more persons or an organization to which one or more persons belong. Terminal 43 stores value information related to the energy consumption by the third user in the distributed ledger managed by ledger network 30. In addition, terminal 43 operates in cooperation with terminal 42 to convert the value information related to the energy consumption by the third user into value information obtained by evaluating, based on a standard evaluation scale, the energy consumption by the third user.

Figure 2:
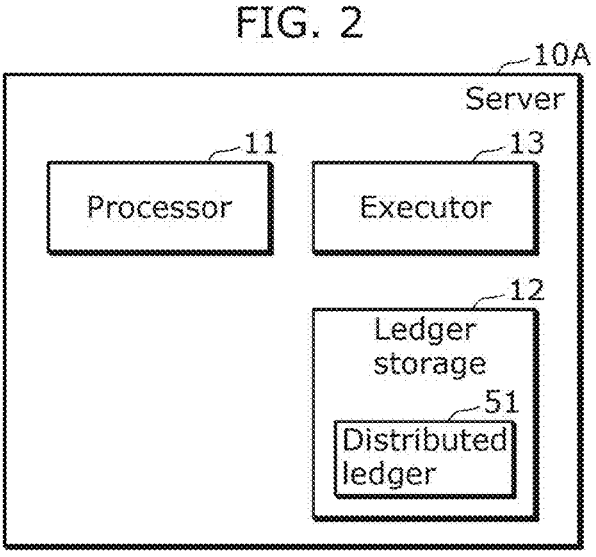
FIG. 2 is a block diagram illustrating a first example of a configuration of a server according to the embodiment.

FIG. 2 is a block diagram illustrating a first example of a configuration of a server according to the present embodiment. Specifically, FIG. 2 is a block diagram illustrating a configuration of server 10A.

As illustrated in FIG. 2, server 10A includes processor 11, ledger storage 12, and executor 13. Hereafter, server 10A will be described as a representative of server 10A, etc. Servers 10B and 10C each have the same functions as server 10A.

Processor 11 is a functional unit that executes a process related to transaction data. Processor 11 can be realized by a processor (e.g., central processing unit (CPU)) included in server 10A executing a program using memory.

Processor 11 executes a process of obtaining transaction data and storing the obtained transaction data in distributed ledger 51.

When storing new transaction data in distributed ledger 51, processor 11 stores the new transaction data in ledger storage 12 using a method appropriate to the type of distributed ledger 51. Processor 11 also transmits and receives communication data to and from ledger storage 12 included in another server among servers 10A, etc., and causes ledger storage 12 included in the other server to store the transaction data. For example, when distributed ledger 51 is a blockchain, processor 11 generates a block including new transaction data, and after forming a consensus on the generated block using a consensus algorithm among server 10A, etc., processor 11 stores the block in ledger storage 12.

The transaction data stored in distributed ledger 51 by processor 11 includes transaction data A1 which includes value information obtained by evaluating, based on the $CO_2$ emission reduction amount, the energy consumption by the first user, and transaction data A2 (also referred to as first transaction data) which indicates that the value information is to be transferred from the first user to the second user. When transaction data A2 is stored in distributed ledger 51 in a confidential state, the transaction data stored in distributed ledger 51 by processor 11 includes transaction data A5 (also referred to as fourth transaction data) which includes key information to remove the confidential state of transaction data A2.

Ledger storage 12 is a storage that stores distributed ledger 51. Distributed ledger 51 stored in ledger storage 12 stores one or more items of transaction data, and is managed to be difficult to tamper with using characteristics of hash values and the like (see below). Ledger storage 12 stores the transaction data provided by processor 11 in distributed ledger 51. The transaction data stored in distributed ledger 51 is managed such that the data is not tampered with, based on the characteristic that the information stored in distributed ledger 51 is difficult to tamper with.

Distributed ledger 51 is a blockchain, for example, and this case will be described as an example. However, other methods of distributed ledgers (e.g., IOTA or hash graphs) can also be employed. The distributed ledger may or may not execute consensus algorithms (e.g., practical byzantine fault tolerance (PBFT), proof of work (PoW), or proof of stake (POS)) when storing new data. Hyperledger fabric is an example of a distributed ledger technique that does not execute a consensus algorithm.

Executor 13 is a functional unit that executes a process according to a program code when the transaction data stored in distributed ledger 51 stored in ledger storage 12 includes the program code (also generally referred to as a contract code). Executor 13 can be realized by a processor (e.g., CPU) included in server 10A executing a program using memory. Executor 13 executes a process by smart contract according to the program code included in the transaction data stored in distributed ledger 51.

Specifically, when transaction data A2 is stored in distributed ledger 51 in a confidential state, and when transaction data A5 including key information is stored in distributed ledger 51, executor 13 determines whether to approve transaction data A5 using the key information. When determining that transaction data A5 is to be approved, executor 13 executes the process of removing the confidential state of transaction data A2.

Figure 3:
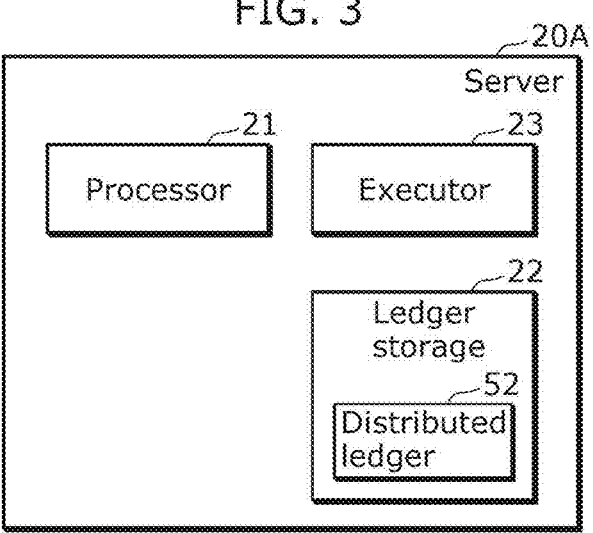
FIG. 3 is a block diagram illustrating a second example of a configuration of a server according to the embodiment.

FIG. 3 is a block diagram illustrating a second example of a configuration of the server according to the present embodiment. Specifically, FIG. 3 is a block diagram illustrating a configuration of server 20A.

As illustrated in FIG. 3, server 20A includes processor 21, ledger storage 22, and executor 23. Hereinafter, server 20A will be described as a representative of server 20A, etc. Servers 20B and 20C each have the same function as server 20A.

Processor 21 is a functional unit that executes a process related to transaction data. Processor 21 can be realized by a processor (e.g., CPU) included in server 20A executing a program using memory.

Processor 21 executes the processes of obtaining transaction data and storing the obtained transaction data in distributed ledger 52. The description of the process performed by processor 21 for storing transaction data in distributed ledger 52 is the same as the description of processor 11 of server 10A, etc., and is therefore omitted.

The transaction data stored in distributed ledger 52 by processor 21 includes transaction data A3 (also referred to as second transaction data) indicating that the value information obtained by evaluating, based on a standard valuation scale (second value information), the first energy consumption by the first user is to be transferred from the second user to the first user.

When transaction data A3 is stored in distributed ledger 52 in a confidential state, the transaction data stored in distributed ledger 52 by processor 21 includes transaction data A4 (also referred to as third transaction data) which includes key information to remove the confidential state of transaction data A3.

Furthermore, the transaction data stored in distributed ledger 52 by processor 21 is transaction data B3 (also referred to as sixth transaction data) which indicates that the value information obtained by evaluating, based on the third evaluation scale (third value information), the second energy consumption by the third user is to be transferred from the second user to the third user.

When transaction data B3 is stored in distributed ledger 52 in a confidential state, the transaction data stored in distributed ledger 52 by processor 21 includes transaction data B4 which includes key information to remove the confidential state of transaction data B3.

Ledger storage 22 is a storage that stores distributed ledger 52. The description of distributed ledger 52 stored in ledger storage 22 is the same as the description of distributed ledger 51 of server 10A, etc., and is therefore omitted.

Executor 23 is a functional unit that executes a process according to a program code when the transaction data stored in distributed ledger 52 stored in ledger storage 22 includes the program code. The description of the process executed by executor 23 according to the program code is the same as the description of executor 13 such as server 10A, etc., and is therefore omitted.

Specifically, when transaction data A3 is stored in distributed ledger 52 in a confidential state, and when transaction data A4 including key information is stored in distributed ledger 52, executor 23 determines whether to approve transaction data A4 using the key information. When determining that transaction data A4 is to be approved, executor 23 executes a process of removing the confidential state of transaction data A3.

Figure 4:
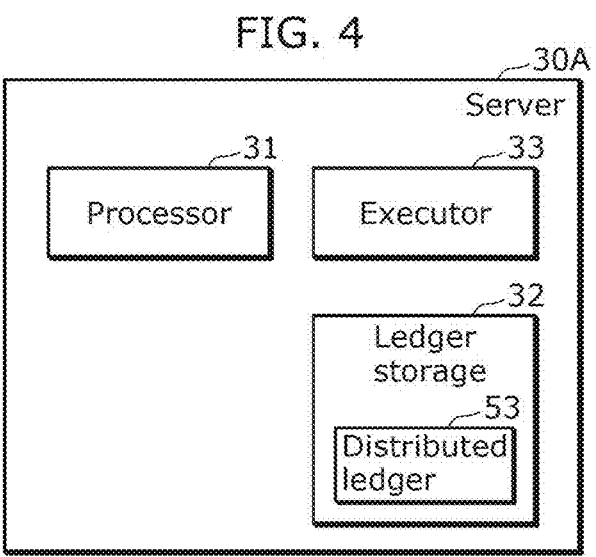
FIG. 4 is a block diagram illustrating a third example of a configuration of a server according to the embodiment.

FIG. 4 is a block diagram illustrating a third example of a configuration of the server according to the present embodiment. Specifically, FIG. 4 is a block diagram illustrating a configuration of server 30A.

As illustrated in FIG. 4, server 30A includes processor 31, ledger storage 32, and executor 33. Hereafter, server 30A will be described as a representative of server 30A, etc. Servers 30B and 30C each have the same function as server 30A.

Processor 31 is a functional unit that executes a process related to transaction data. Processor 31 can be realized by a processor (e.g., CPU) included in server 30A executing a program using memory.

Processor 31 executes the processes of obtaining transaction data and storing the obtained transaction data in distributed ledger 53. The description of the process executed by processor 31 for storing the transaction data in distributed ledger 53 is the same as the description of processor 11 of server 10A etc., and is therefore omitted.

The transaction data stored in distributed ledger 53 by processor 31 includes transaction data B1 including value information obtained by evaluating, based on the renewable energy generation amount, the energy consumption by the third user, and transaction data B2 (also referred to as fifth transaction data) which indicates that the value information is to be transferred from the third user to the second user. When transaction data B2 is stored in distributed ledger 53 in a confidential state, the transaction data stored in distributed ledger 53 by processor 31 includes transaction data B5 (also referred to as sixth transaction data) which includes key information to remove the confidential state of transaction data B2.

Ledger storage 32 is a storage that stores distributed ledger 53. The description of distributed ledger 53 stored in ledger storage 32 is the same as the description of distributed ledger 51 of server 10A, etc., and is therefore omitted.

Executor 33 is a functional unit that executes a process according to a program code when the transaction data stored in distributed ledger 53 stored in ledger storage 32 includes the program code. The description of the process executed by executer 33 according to the program code is the same as the description of executor 13 such as server 10A, etc., and is therefore omitted.

Specifically, when transaction data B2 is stored in distributed ledger 53 in a confidential state, and when transaction data B5 including key information is stored in distributed ledger 53, executor 33 determines whether to approve transaction data B5 using the key information. When determining that transaction data B5 is to be approved, executor 33 executes a process of removing the confidential state of transaction data B2.

FIG. 5 illustrates a first example of value information according to the present embodiment.

The value information illustrated in FIG. 5 is the value information for the first user when the $CO_2$ emission reduction amount is used as an evaluation scale. The value information illustrated in FIG. 5 is an example of the value information included in transaction data A1 stored in distributed ledger 51.

As illustrated in FIG. 5, the value information includes $CO_2$ emission reduction amount, device ID, and time period.

The $CO_2$ emission reduction amount is a value indicating the $CO_2$ emission reduction amount achieved by the first user. The $CO_2$ emission reduction amount can be calculated, for example, by multiplying a difference in electricity by the $CO_2$ emission count ($CO_2$ emission amount per unit of electricity). The difference in power is obtained by subtracting, from the power consumption by a device when operated, the power consumption by a conventional device of the same type as the device, which does not have the functions or structure, etc. related to $CO_2$ emission reduction, when operated for the same period as the device. The $CO_2$ emission reduction amount is expressed in, for example, a unit of t.

The device ID is identification information of the device that contributed to the $CO_2$ emission reduction amount. The device ID includes, for example, unique identification information of the device (e.g., serial number). The device ID may include the identification information of the manufacturer of the device.

The time period is information indicating the period of time during which the $CO_2$ emission reduction amount was achieved. The time period indicates the above time period, for example, in the format of year, month, and day.

The value information illustrated in FIG. 5 indicates that the device with a device ID P0001 owned by the first user reduced (in other words, curbed) $CO_2$ emissions by A[t] during the time period from January to December 2020.

FIG. 6 illustrates a second example of the value information according to the present embodiment.

The value information illustrated in FIG. 6 is the value information for the third user when renewable energy generation amount is used as an evaluation scale. The value information illustrated in FIG. 6 is an example of the value information included in transaction data B1 stored in distributed ledger 53.

As illustrated in FIG. 6, the value information includes renewable energy generation amount, device ID, and time period.

The renewable energy generation amount is a value indicating the renewable energy generation amount achieved by the third user. The renewable energy generation amount is the amount of electricity generated by the device using renewable energy. The renewable energy generation amount is expressed in, for example, a unit of kWh.

The device ID is the identification information of the device that contributed to the power generation related to the renewable energy generation amount. The device ID includes, for example, a unique identification information of the device (e.g., serial number). The device ID may include the identification information of the manufacturer of the device.

The time period is information indicating the period of time during which electricity was generated for the renewable energy generation amount. The time period indicates the above time period, for example, in the format of year, month, and day.

The value information illustrated in FIG. 6 indicates that the device with a device ID Q00305 owned by the third user generated B [kWh] of electricity by using renewable energy during the time period from April to June 2020.

FIG. 7 illustrates a third example of the value information according to the present embodiment.

The value information illustrated in FIG. 7 is value information for the first user and the third user, and is value information (also referred to as environmental values) based on a standard evaluation scale as an evaluation scale.

The value information illustrated in FIG. 7 is an example of value information evaluated based on a standard evaluation value converted from the value information indicated by transaction data A1 stored in distributed ledger 51 or transaction data B1 stored in distributed ledger 53.

As illustrated in FIG. 7, the value information includes environmental value, device ID, and time period.

The environmental value is a value obtained by converting the $CO_2$ emission reduction amount achieved by the first user or the renewable energy generation amount achieved by the third user into an environmental value based on a standard evaluation scale. The unit of the environmental value may be any unit.

The device ID and the time period are the same as those illustrated in FIG. 5 or FIG. 6.

The value information illustrated in the upper row of FIG. 7 indicates that the device with a device ID P0001 owned by the first user achieved environmental value SA during the time period from January to December 2020.

The value information illustrated in the lower row of FIG. 7 indicates that the device with a device ID Q00305 owned by the third user achieved environmental value SB during the time period from April to June 2020.

The processes executed by information processing system 1 configured as described above will be described below.

FIG. 8 is a first flow diagram illustrating the processes executed by information processing system 1 according to the present embodiment. The processes illustrated in FIG. 8 are processes of converting the $CO_2$ emission reduction amount of the first user and the renewable energy generation amount of the third user into environmental values, and managing the environmental values in distributed ledgers.

In step S11, terminal 41 stores the $CO_2$ emission reduction amount of the first user in distributed ledger 51.

In step S12, terminals 41 and 42 convert the $CO_2$ emission reduction amount of the first user stored in distributed ledger 51 in step S11 into an environmental value and store the environmental value in distributed ledger 52.

In step S13, terminal 43 stores the renewable energy generation amount of the third user in distributed ledger 53.

In step S14, terminals 43 and 42 convert the renewal energy generation amount of the third user stored in distributed ledger 53 in step S13 into an environmental value, and store the environmental value in distributed ledger 52.

The details of the processes illustrated in FIG. 8 will be described below.

Figure 9:
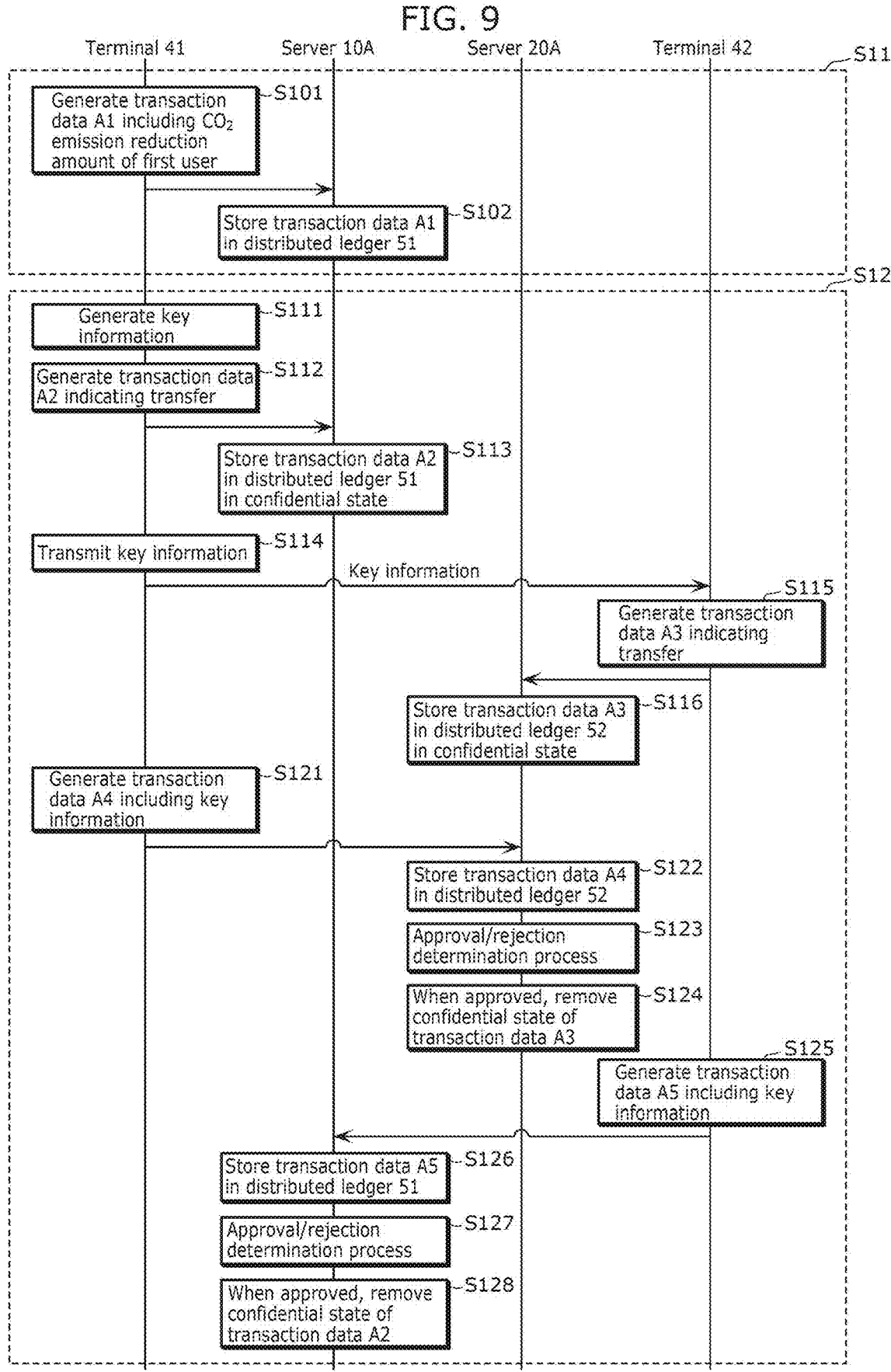
FIG. 9 is a first sequence diagram illustrating detailed processes executed by the information processing system according to the embodiment.

FIG. 9 is a first sequence diagram illustrating the detailed processes executed by information processing system 1 according to the present embodiment. The processes of steps S101 to S102 described below correspond to step S11 (see FIG. 8), and the processes of steps S111 to S128 described below correspond to step S12 (see FIG. 8). This section describes the process flow of storing transaction data in a distributed ledger in a confidential state and then removing the confidential state of the transaction data.

In step S101, terminal 41 generates transaction data A1 including the $CO_2$ emission reduction amount of the first user. At this time, terminal 41 obtains the $CO_2$ emission reduction amount, for example, by calculating the $CO_2$ emission reduction amount using the operating hours of the device owned by the first user obtained from the log information of the device, and generates the transaction data including the obtained $CO_2$ emission reduction amount as transaction data A1. Terminal 41 transmits generated transaction data A1 to server 10A, etc.

In step S102, server 10A, etc. receives transaction data A1 transmitted in step S101 and stores transaction data A1 in distributed ledger 51.

In step S111, terminal 41 generates key information. The key information is used to remove the confidential states of transaction data A2 and A3 (to be described later). Terminal 41 generates the key information, for example, by generating random bytes and obtaining the hash values of the generated bytes as key information.

In step S112, terminal 41 generates transaction data A2 indicating that the $CO_2$ emission reduction amount of the first user is to be transferred from the first user to the second user. When transaction data A2 is stored in distributed ledger 51 in a confidential state, transaction data A2 further includes a contract code to remove the confidential state of transaction data A2 using key information. Terminal 41 transmits generated transaction data A2 to server 10A, etc. Server 10A, etc. receives transmitted transaction data A2.

In step S113, server 10A, etc. stores transaction data A2 received in step S112 in distributed ledger 51. At this time, server 10A, etc. stores transaction data A2 in distributed ledger 51 in a confidential state. The details in transaction data A2 in a confidential state are managed in such a way that they cannot be read. The same also applies to transaction data in a confidential state to be described below.

In step S114, terminal 41 transmits the key information generated in step S111 to terminal 42. Terminal 42 receives the transmitted key information. The key information may be transmitted and received in any manner, e.g., by e-mail.

In step S115, terminal 42 converts the $CO_2$ emission reduction amount of the first user into an environmental value. Terminal 42 then generates transaction data A3 indicating that the environmental value is to be transferred from the second user to the first user. When transaction data A3 is stored in distributed ledger 52 in a confidential state, transaction data A3 further includes a contract code to remove the confidential state of transaction data A3 using key information. Terminal 42 transmits generated transaction data A3 to server 20A, etc. Server 20A, etc. receives transmitted transaction data A3.

In step S116, server 20A, etc. stores transaction data A3 received in step S115 in distributed ledger 52. At this time, server 20A, etc. stores transaction data A3 in distributed ledger 52 in a confidential state.

In step S121, terminal 41 generates transaction data A4 including the key information generated in step S111. Terminal 41 transmits generated transaction data A4 to server 20A, etc. Server 20A, etc. receives transmitted transaction data A4.

In step S122, server 20A, etc. stores transaction data A4 received in step S121 in distributed ledger 52. By storing transaction data A4 in distributed ledger 52, and server 20A, etc. executing the contract code included in transaction data A3, the processes of steps S123 and S124 are executed.

In step S123, server 20A, etc. executes a process of determining whether to approve transaction data A4 (also referred to as approval/rejection determination process). In the above process, when the key information included in transaction data A4 received in step S121 matches the key information generated in step S111, server 20A, etc. determines that transaction data A4 is to be approved. When determining that transaction data A4 is to be approved, server 20A, etc. executes step S124.

In step S124, server 20A, etc. removes the confidential state of transaction data A3 stored in distributed ledger 52 in step S116. The details in transaction data A3, whose confidential state has been removed, are managed in such a way that they can be read. The same also applies to subsequent transaction data whose confidential state has been removed.

In step S125, terminal 42 generates transaction data A5 including the key information received in step S114. Terminal 42 transmits generated transaction data A5 to server 10A, etc. Server 10A, etc. receives transmitted transaction data A5.

In step S126, server 10A, etc. stores transaction data A5 received in step S125 in distributed ledger 51. By storing transaction data A5 in distributed ledger 51, and server 10A, etc. executing the contract code included in transaction data A5, the processes of steps S127 and S128 are executed.

In step S127, server 10A, etc. executes a process of determining whether to approve transaction data A5 (also referred to as approval/rejection determination process). In the above process, when the key information included in transaction data A5 received in step S125 matches the key information generated in step S111, server 10A, etc. determines that transaction data A5 is to be approved. When server 10A, etc. determines that transaction data A5 is to be approved, server 10A, etc. executes step S128.

In step S128, server 10A, etc. removes the confidential state of transaction data A2 stored in distributed ledger 51 in step S113.

When terminal 42 stores transaction data A3 in distributed ledger 52 (step S116), or when terminal 42 removes the confidential state of transaction data A3 stored in distributed ledger 52 (step S124), duplicate management of the evaluation information related to the evaluation of the same energy consumption (that is, $CO_2$ emission reduction amount) may be eliminated. Specifically, terminal 42 determines whether other transaction data indicating a transfer of the second value information of the first energy consumption to which the second transaction data to be stored is related has already been stored in distributed ledger 52. When determining that the other transaction data has already been stored in distributed ledger 52, terminal 42 may prevent the second transaction data from being stored in distributed ledger 52. This reduces unnecessary memory consumption.

Figure 10:
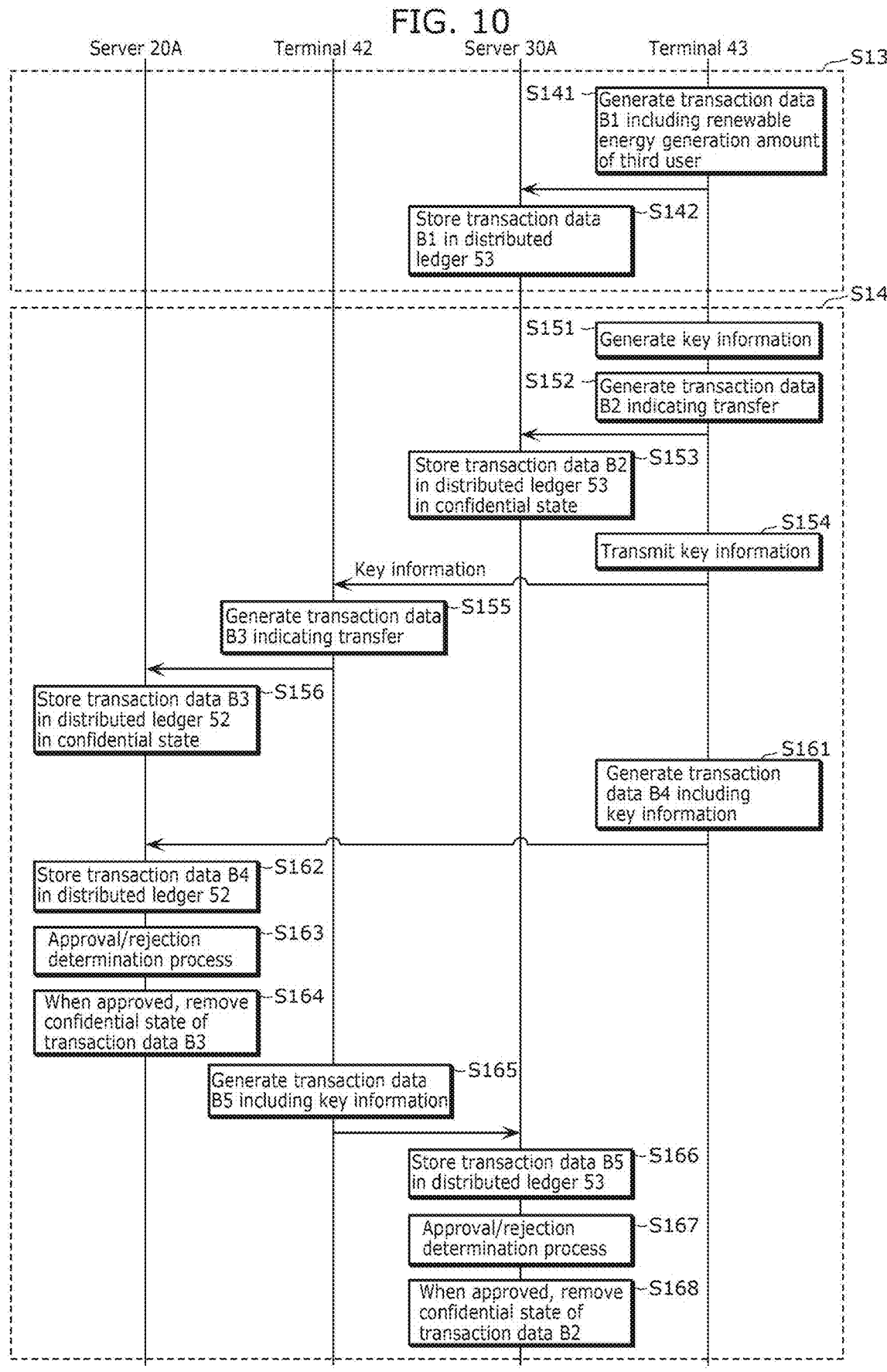
FIG. 10 is a second sequence diagram illustrating detailed processes executed by the information processing system according to the embodiment.

FIG. 10 is a second sequence diagram illustrating the detailed processes executed by information processing system 1 according to the present embodiment. The processes of steps S141 to S142 described below correspond to step S13 (see FIG. 8), and the processes of steps S151 to S168 described below correspond to step S14 (see FIG. 8). This section describes the process flow of storing transaction data in a distributed ledger in a confidential state and then removing the confidential state.

In step S141, terminal 43 generates transaction data B1 including the renewable energy generation amount of the third user. At this time, terminal 43 obtains the renewable energy generation amount, for example, by calculating the renewable energy generation amount using the operating hours obtained from the log information of the renewable energy generation device owned by the third user, and generates transaction data including the obtained renewable energy generation amount as transaction data B1. Terminal 43 transmits generated transaction data B1 to server 30A, etc.

In step S142, server 30A, etc. receives transaction data B1 transmitted in step S141 and stores transaction data B1 in distributed ledger 53.

In step S151, terminal 43 generates key information. The key information is used to remove the confidential states of transaction data B2 and B3 (to be described later). The key information is generated in the same manner as the key information generated by terminal 41 in step S111 (see FIG. 9). The details of the key information may be the same or different from the key information generated by terminal 41.

In step S152, terminal 43 generates transaction data B2 indicating that the renewable energy generation amount of the third user is to be transferred from the third user to the second user. When transaction data B2 is stored in distributed ledger 53 in a confidential state, transaction data B2 further includes a contract code to remove the confidential state of transaction data B2 using key information. Terminal 43 transmits generated transaction data B2 to server 30A, etc. Server 30A, etc. receives transmitted transaction data B2.

In step S153, server 30A, etc. stores, in distributed ledger 53, transaction data B2 received in step S152. At this time, server 30A, etc. stores transaction data B2 in distributed ledger 53 in a confidential state.

In step S154, terminal 43 transmits the key information generated in step S151 to terminal 42. Terminal 42 receives the transmitted key information.

In step S155, terminal 42 converts the renewal energy generation amount of the third user into an environmental value, and generates transaction data B3 indicating that the environmental value is to be transferred from the second user to the third user. When transaction data B3 is stored in distributed ledger 53 in a confidential state, transaction data B3 further includes a contract code for removing the confidential state of transaction data B3 using key information. Terminal 43 transmits generated transaction data B3 to server 20A, etc. Server 20A, etc. receives transmitted transaction data B3.

In step S156, server 20A, etc. stores transaction data B3 received in step S155 in distributed ledger 52. At this time, server 20A, etc. stores transaction data B3 in distributed ledger 52 in a confidential state.

In step S161, terminal 43 generates transaction data B4 including the key information generated in step S151. Terminal 43 transmits generated transaction data B4 to server 20A, etc. Server 20A, etc. receives transmitted transaction data B4.

In step S162, server 20A, etc. stores transaction data B4 received in step S161 in distributed ledger 52. By storing transaction data B4 in distributed ledger 52, and server 20A, etc. executing the contract code included in transaction data B3, the processes of steps S163 and S164 are executed.

In step S163, server 20A, etc. executes a process of determining whether to approve transaction data B4 (also referred to as approval/rejection determination process). In the above process, when the key information included in transaction data B4 received in step S161 matches the key information generated in step S151, server 20A, etc. determines that transaction data B4 is to be approved. When determining that transaction data B4 is to be approved, server 20A, etc. executes step S164.

In step S164, server 20A, etc. removes the confidential state of transaction data B3 stored in distributed ledger 52 in step S156.

In step S165, terminal 42 generates transaction data B5 including the key information received in step S154. Terminal 42 transmits generated transaction data B5 to server 30A, etc. Server 30A, etc. receives transmitted transaction data B5.

In step S166, server 30A, etc. stores transaction data A5 received in step S165 in distributed ledger 53. By storing transaction data B5 in distributed ledger 53, and server 30A, etc. executing the contract code included in transaction data B5, the processes of steps S167 and S168 are executed.

In step S167, server 30A, etc. executes a process of determining whether to approve transaction data B5 (also referred to as approval/rejection determination process). In the above process, when the key information included in transaction data B5 received in step S165 matches the key information generated in step S151, server 30A, etc. determines that transaction data B5 is to be approved. When determining that transaction data B5 is to be approved, server 30A, etc. executes step S168.

In step S168, server 30A, etc. removes the confidential state of transaction data B2 stored in distributed ledger 53 in step S153.

By the processes illustrated in FIG. 8 to FIG. 10, information processing system 1 converts each of the $CO_2$ emission reduction amount of the first user and the renewable energy generation amount of the third user into an environmental value and stores the environmental values in distributed ledger 52. The environmental values stored in distributed ledger 52 can be referred to by other devices. Thus, for example, a user who wishes to refer to the environmental value of each user is able to refer to distributed ledger 52 to recognize the environmental values of the first user and the third user. Therefore, information processing system 1 is capable of appropriately evaluating energy consumption.

In the following, the technique on the management of conversion rules for converting $CO_2$ emission reduction amount or renewable energy generation amount into an environmental value will be described.

Figure 11:
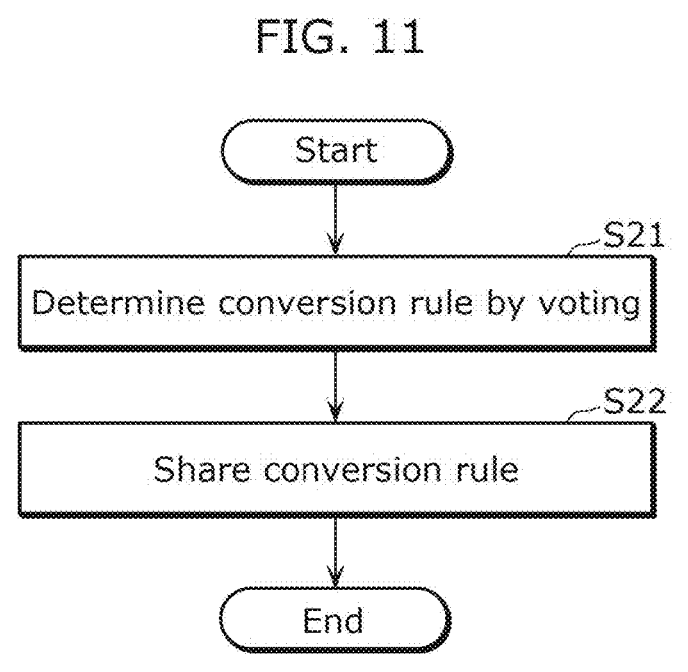

FIG. 11 is a second flow diagram illustrating the processes executed by information processing system 1 according to the present embodiment. The processes illustrated in FIG. 11 are for managing conversion rules for converting the $CO_2$ emission reduction amount of the first user or the renewable energy generation amount of the third user into an environmental value through a distributed ledger.

First, it is assumed that at the time when step S21 is executed, multiple candidates for conversion rule are publicly known and the first user and the third user are aware of the multiple candidates. The multiple candidates for conversion rule differ from each other, for example, in the rate of conversion from $CO_2$ emission reduction amount or renewable energy generation amount into an environmental value. By executing the series of processes illustrated in FIG. 11, one of the multiple candidates is determined as a conversion rule.

In step S21, information processing system 1 determines a conversion rule by voting.

In step S22, information processing system 1 shares the conversion rule determined in step S21 among the servers in information processing system 1 (more specifically, server 10A, etc., server 20A, etc., and server 30A, etc.).

The details of the processes illustrated in FIG. 11 will be described below.

Figure 12:
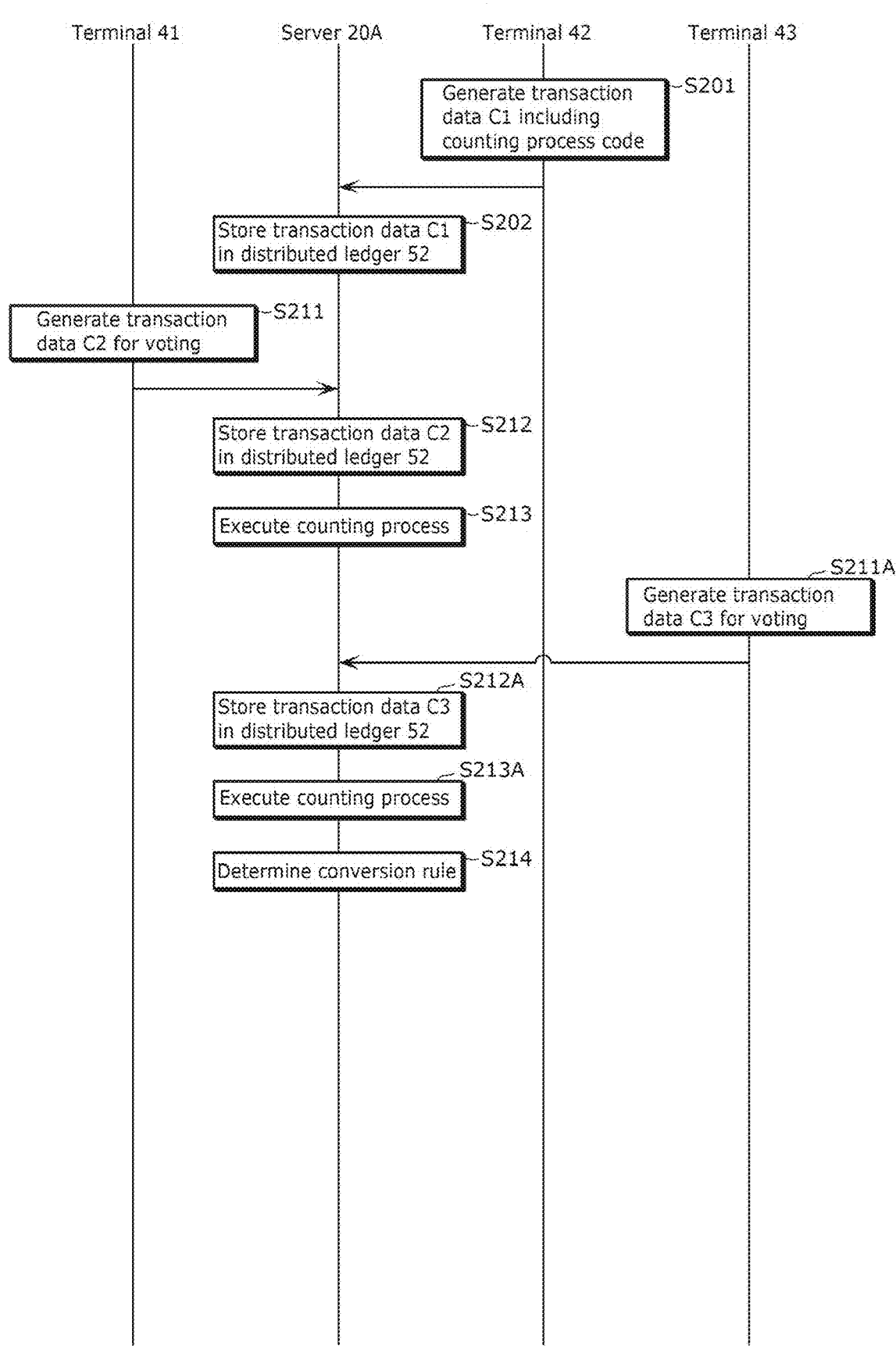
FIG. 12 is a third sequence diagram illustrating detailed processes executed by the information processing system according to the embodiment.

FIG. 12 is a third sequence diagram illustrating the detailed processes executed by information processing system 1 according to the present embodiment. The processes illustrated in FIG. 12 are included in step S21 of FIG. 11.

In step S201, terminal 42 generates transaction data C1 including a contract code for vote counting process. The vote counting process includes, when transaction data including the contract code for voting (specifically, transaction data C2 and C3 to be described below) is received, a process of adding 1 to the number of votes for the candidate a vote is casted included in the received transaction data. Transaction data C1 also includes a contract code for a process of determining a conversion rule based on the result of the vote counting process when a predetermined voting period has ended. Terminal 41 transmits generated transaction data C1 to server 20A, etc. Server 20A, etc. receives transmitted transaction data C1.

In step S202, server 20A, etc. stores transaction data C1 received in step S201 in distributed ledger 52.

In step S211, terminal 41 generates transaction data C2 for voting. Transaction data C2 includes information indicating which candidate the first user votes for among multiple candidates for conversion rule. Terminal 41 transmits generated transaction data C2 to server 20A, etc. Server 20A, etc. receives transaction data C2.

In step S212, server 20A, etc. stores transaction data C2 received in step S211 in distributed ledger 52. By storing transaction data C2 in distributed ledger 52, and server 20A, etc. executing the contract code included in transaction data C1, the process of step S213 is executed.

In step S213, server 20A, etc. performs a vote counting process. Server 20A, etc. adds 1 to the number of votes for which candidate the first user votes for included in transaction data C2 received in step S212 in the counting process.

In step S211A, terminal 43 generates transaction data C3 for voting. Transaction data C3 includes information indicating which candidate the third user votes for among multiple candidates for conversion rule. Terminal 43 transmits generated transaction data C3 to server 20A, etc. Server 20A, etc. receives transaction data C3.

Server 20A, etc. that has received transaction data C3 stores received transaction data C3 in distributed ledger 52 and executes the vote counting process (steps S212A and S213A), in a similar manner to steps S212 and S213.

It is assumed that the voting period ends after step S213A is executed.

In step S214, server 20A, etc. determines a conversion rule using the result of the counting process (steps S213 and S213A) performed during the voting period. More specifically, server 20A, etc. determines the candidate that has received the largest number of votes during the voting period as a conversion rule.

Figure 13:
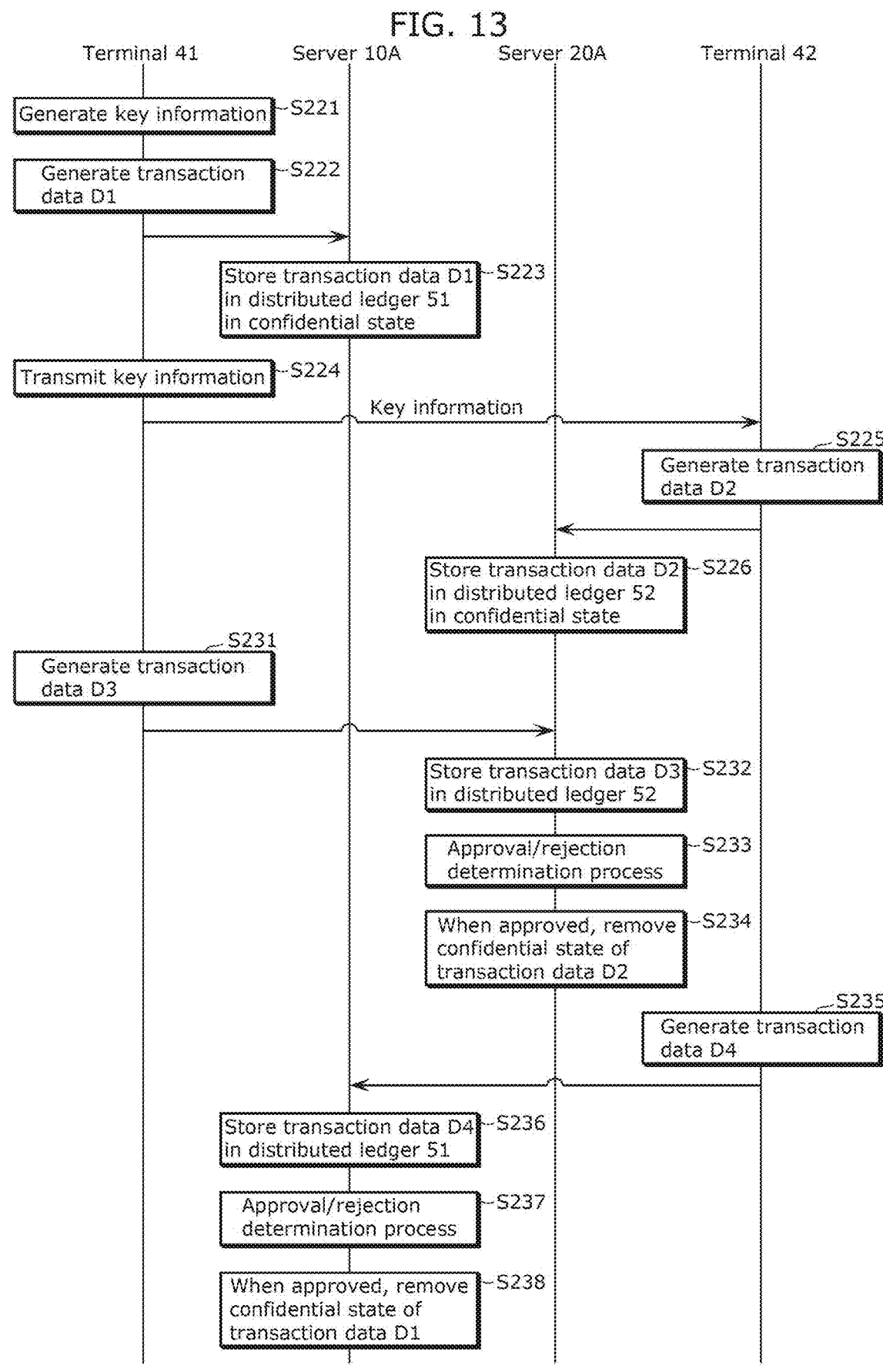
FIG. 13 is a fourth sequence diagram illustrating detailed processes executed by the information processing system according to the embodiment.

FIG. 13 is a fourth sequence diagram illustrating the detailed processes executed by information processing system 1 according to the present embodiment. The processes illustrated in FIG. 13 are included in step S22 of FIG. 11.

In step S221, terminal 41 generates key information. The key information is used to remove the confidential state of transaction data D2 and D3 (to be descried later).

In step S222, terminal 41 generates transaction data D1 indicating that information indicating that the first user agrees with the conversion rule determined in step S21 of FIG. 11 (more specifically, step S214 of FIG. 12) is to be transferred from the first user to the second user. When transaction data D1 is stored in distributed ledger 51 in a confidential state, transaction data D1 further includes a contract code to remove the confidential state of transaction data D1 using key information. Terminal 41 transmits generated transaction data D1 to server 10A, etc. Server 10A, etc. receives transmitted transaction data D1.

In step S223, server 10A, etc. stores transaction data D1 received in step S222 in distributed ledger 51. At this time, server 10A, etc. stores transaction data D1 in distributed ledger 51 in a confidential state.

In step S224, terminal 41 transmits the key information generated in step S221 to terminal 42. Terminal 42 receives the transmitted key information. The key information may be transmitted and received in any manner, e.g., by e-mail.

In step S225, terminal 42 generates transaction data D2 indicating that the conversion rule determined in step S214 (see FIG. 12) is to be transferred from the second user to the first user. When transaction data D2 is stored in distributed ledger 52 in a confidential state, transaction data D2 further includes a contract code to remove the confidential state of transaction data D2 using key information. Terminal 42 transmits generated transaction data D2 to server 20A, etc. Server 20A, etc. receives transmitted transaction data D2.

In step S226, server 20A, etc. stores transaction data D2 received in step S225 in distributed ledger 52. At this time, server 20A, etc. stores transaction data D2 in distributed ledger 52 in a confidential state.

In step S231, terminal 41 generates transaction data D3 including the key information generated in step S221. Terminal 41 transmits generated transaction data D3 to server 20A, etc. Server 20A, etc. receives transmitted transaction data D3.

In step S232, server 20A, etc. stores transaction data D3 received in step S231 in distributed ledger 52. By storing transaction data D3 in distributed ledger 52, and server 20A, etc. executing the contract code included in transaction data D2, the processes of steps S233 and S234 are executed.

In step S233, server 20A, etc. executes a process of determining whether to approve transaction data D3 (also referred to as approval/rejection determination process). In the above process, when the key information included in transaction data D3 received in step S231 matches the key information generated in step S221, server 20A, etc. determines that transaction data D3 is to be approved. When determining that transaction data D3 is to be approved, server 20A, etc. executes step S234.

In step S234, server 20A, etc. removes the confidential state of transaction data D2 stored in distributed ledger 52 in step S226.

In step S235, terminal 42 generates transaction data D4 including the key information received in step S224. Terminal 42 transmits generated transaction data D4 to server 10A, etc. Server 10A, etc. receives transmitted transaction data D4.

In step S236, server 10A, etc. stores transaction data D4 received in step S235 in distributed ledger 51. By storing transaction data D4 in distributed ledger 51, and server 10A, etc. executing the contract code included in transaction data D4, the processes of steps S237 and S238 are executed.

In step S237, server 10A, etc. executes a process of determining whether to approve transaction data D4 (also referred to as approval/rejection determination process). In the above process, when the key information included in transaction data D4 received in step S235 matches the key information generated in step S221, server 10A, etc. determines that transaction data D4 is to be approved. When determining that transaction data D4 is to be approved, server 10A, etc. executes step S238.

In step S238, server 10A, etc. removes the confidential state of transaction data D1 stored in distributed ledger 51 in step S223. The processes illustrated in FIG. 11 to FIG. 13 allow information processing system 1 to appropriately evaluate energy consumption.

Variation of Embodiment

Figure 14:
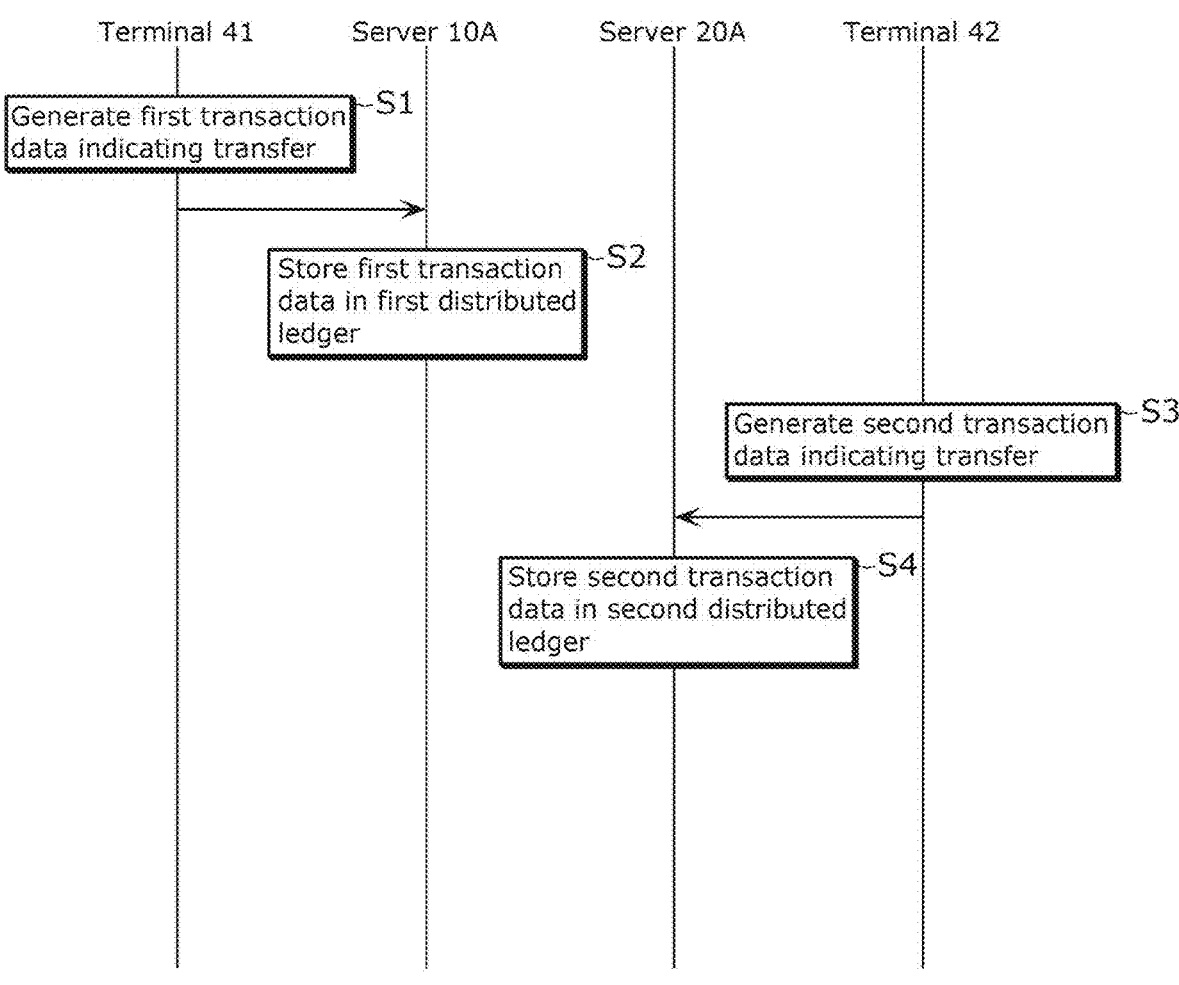
FIG. 14 is a sequence diagram illustrating detailed processes executed by an information processing system according to a variation of the embodiment.

FIG. 14 is a sequence diagram illustrating the detailed processes executed by an information processing system according to a variation. In the variation, the process flow of storing transaction data in a distributed ledger without setting the transaction data to a confidential state will be described.

In step S1, terminal 41 generates first transaction data indicating that first value information obtained by evaluating, based on the first evaluation scale, first energy consumption by the first user is to be transferred from the first user to the second user, and transmits the first transaction data to server 10A, etc. Server 10A, etc. receives the transmitted first transaction data. The first transaction data corresponds to, for example, transaction data A2 according to the embodiment described above.

In step S2, server 10A, etc. stores the first transaction data received in step S1 in a first distributed ledger.

In step S3, terminal 42 generates second transaction data indicating that second value information obtained by evaluating the first energy consumption based on a second evaluation scale, which is different from the first evaluation scale, is to be transferred from the second user to the first user, and transmits the second transaction data to server 20A, etc. Server 20A, etc. receives the transmitted second transaction data. The second transaction data corresponds to, for example, transaction data A3 according to the embodiment described above.

In step S4, server 20A, etc. stores the second transaction data received in step S3 in a second distributed ledger.

The sequence of processes illustrated in FIG. 14 allow the information processing system to appropriately evaluate energy consumption.

(Supplemental Information)

The following is a supplementary explanation of the distributed ledger according to the above embodiment or variation. Here, a blockchain is described as an example of a distributed ledger, but the same applies to other distributed ledgers.

Figure 15:
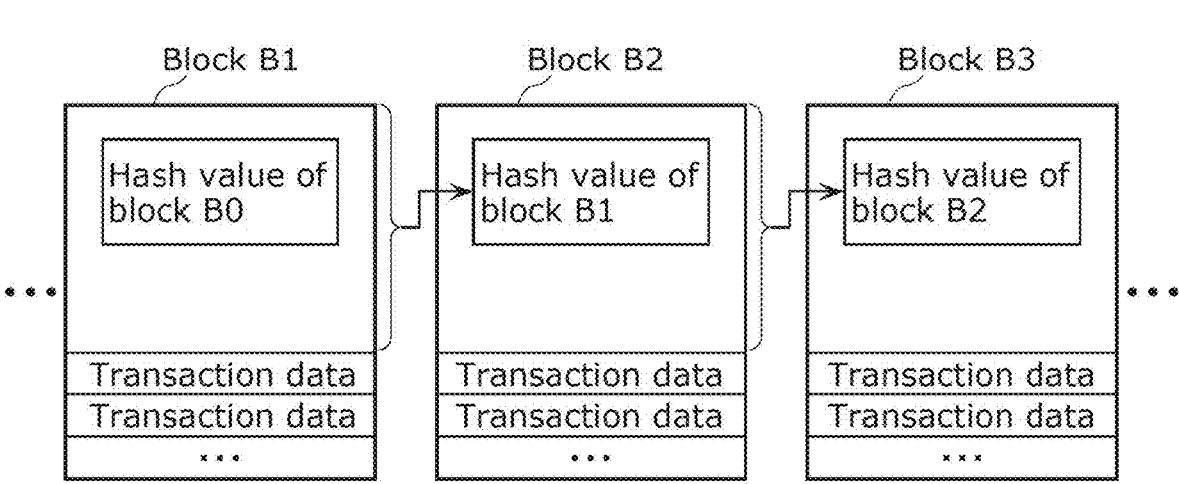
FIG. 15 is an explanatory diagram illustrating a data structure of a blockchain.

FIG. 15 is an explanatory diagram illustrating a data structure of a blockchain.

A blockchain is a chain of blocks connected (a block is a unit of recording). Each block includes a plurality of items of transaction data and a hash value of the immediately preceding block. Specifically, block B2 includes the hash value of block B1 before block B2. The hash value calculated from the plurality of items of transaction data included in block B2 and the hash value of block B1 is then included in block B3 as the hash value of block B2. In this way, blocks are chained together while including the contents of the previous block as a hash value. This effectively prevents tampering with the recorded transaction data.

If the past transaction data is altered, the hash value of the block will be different from the value before being altered. In order to make the altered block appear correct, all subsequent blocks would have to be recreated. This is significantly difficult in practice. This characteristic is used to ensure tamper-resistance in the blockchain.

Figure 16:
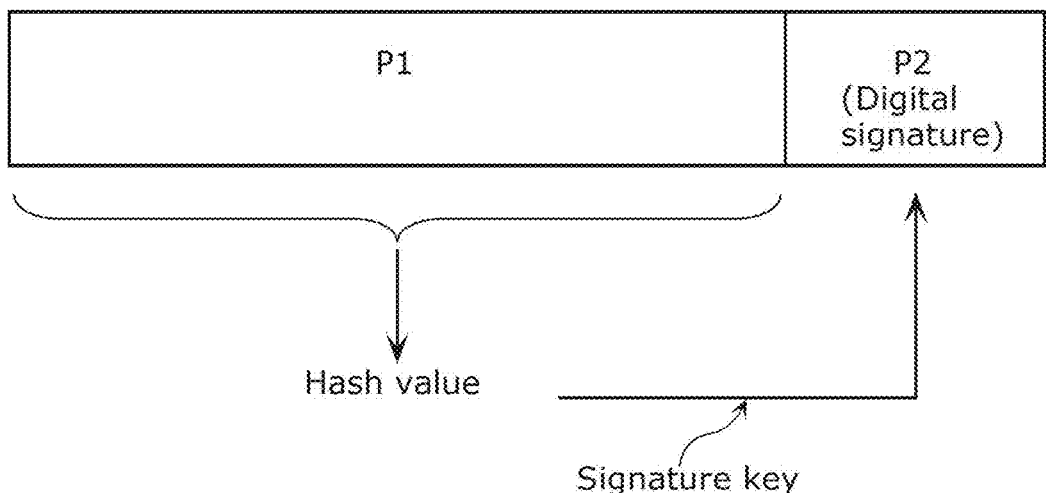
FIG. 16 is an explanatory diagram illustrating a data structure of transaction data.

FIG. 16 illustrates a data structure of transaction data.

The transaction data illustrated in FIG. 16 includes transaction body P1 and digital signature P2. Transaction body P1 is the data body included in the transaction data. Digital signature P2 is generated by signing the hash value of transaction body P1 with the signature key of the creator of the transaction data, or more specifically, by encrypting the hash value with the private key of the creator.

Transaction data is virtually impossible to tamper with because the transaction data includes digital signature P2. This prevents tampering with the transaction body.

Each of the elements in the above-described embodiment may be configured in the form of an exclusive hardware product, or may be realized by executing a software program suitable for the element. Each of the elements may be realized by means of a program executing unit, such as a CPU and a processor, reading and executing the software program recorded on a recording medium such as a hard disk or a semiconductor memory. Here, the software program for realizing the server and the like according to the embodiment is a program described below.

The program causes a computer to execute: an information processing method executed by an information processing system that manages information related to energy consumption. The information processing method includes: storing first transaction data in a first distributed ledger, the first transaction data indicating that first value information is to be transferred from a first user to a second user, the first value information being obtained by evaluating, based on a first evaluation scale, a first energy consumption by the first user; and storing second transaction data in a second distributed ledger, the second transaction data indicating that second value information is to be transferred from the second user to the first user, the second value information being obtained by evaluating the first energy consumption based on a second evaluation scale that is different from the first evaluation scale.

Although the information processing system and the like according to one or more aspects has been described based on the embodiment, the present disclosure is not limited to the embodiment. A form obtained by making various modifications conceivable by those skilled in the art to the embodiment, and a form realized by arbitrarily combining the structural elements in different embodiments without departing from the gist of the present disclosure are also included in the one or more aspects.

INDUSTRIAL APPLICABILITY

The present disclosure is applicable to a system that evaluates energy consumption.

The invention claimed is:

1. An information processing method executed by an information processing system that manages information related to energy consumption, the information processing method comprising:

storing first transaction data in a first distributed ledger in a confidential state, the first transaction data indicating that first value information is to be transferred from a first user to a second user, the first value information being obtained by evaluating, based on a first evaluation scale, a first energy consumption by the first user, the first transaction data including first computer executable program code for removing the confidential state of the first transaction data using first predetermined key information;

storing second transaction data in a second distributed ledger in a confidential state, the second transaction data indicating that second value information is to be transferred from the second user to the first user, the second value information being obtained by converting, according to a conversion rule, the first energy consumption by the first user based on the first evaluation scale into a converted first energy consumption by the first user based on a second evaluation scale that is different from the first evaluation scale, the second transaction data including second computer executable program code for removing the confidential state of the second transaction data using second predetermined key information;

storing third transaction data in a third distributed ledger, the third transaction data indicating that third value information is to be transferred from a third user to the second user, the third value information being obtained by evaluating, based on a third evaluation scale, a second energy consumption by the third user, the third evaluation scale being different from the first evaluation scale and the second evaluation scale; and storing fourth transaction data in the second distributed ledger, the fourth transaction data indicating that fourth value information is to be transferred from the second user to the third user, the fourth value information being obtained by converting, according to the conversion rule, the second energy consumption by the third user based on the third evaluation scale into to a converted second energy consumption by the third user based on the second evaluation scale, wherein the conversion rule is selected from a plurality of candidates for the conversion rule based on a voting process including the first user and the third user, and wherein, in the storing of the second transaction data, when the second transaction data is stored, (i) whether another item of transaction data has already been stored in the second distributed ledger is determined, the other item of transaction data indicating a transfer of the second value information of the first energy consumption to which the second transaction data to be stored is related, and (ii) when determining that the other item of transaction data has already been stored in the second distributed ledger, the second transaction data is prevented from being stored in the second distributed ledger, wherein the information processing method further comprises a process of removing the confidential state of the first transaction data including:

storing fifth transaction data including third predetermined key information in the first distributed ledger;

determining whether the third predetermined key information included in the fifth transaction data matches the first predetermined key information included in the first transaction data; and when the third predetermined key information included in the fifth transaction data matches the first predetermined key information included in the first transaction data, executing the first computer executable program code included in the first transaction data for removing the confidential state of the first transaction data, and wherein the information processing method further comprises a process of removing the confidential state of the second transaction data including:

storing sixth transaction data including fourth predetermined key information in the second distributed ledger;

determining whether the fourth predetermined key information included in the sixth transaction data matches the second predetermined key information included in the second transaction data; and when the fourth predetermined key information included in the sixth transaction data matches the second predetermined key information included in the second transaction data, executing the second computer executable program code included in the second transaction data for removing the confidential state of the second transaction data.

2. The information processing method according to claim 1, wherein the second value information is equivalent to the first value information.

3. The information processing method according to claim 1, wherein the second value information is obtained by multiplying the first value information by a conversion rate.

4. The information processing method according to claim 1, wherein the first distributed ledger is a private distributed ledger, and the second distributed ledger is a public distributed ledger.

5. The information processing method according to claim 1, wherein the first value information is information indicating a $CO_2$ emission reduction amount related to the first energy consumption or a renewable energy generation amount related to the first energy consumption, and the second value information is information obtained by evaluating the first energy consumption based on a standard evaluation scale related to energy consumption.

6. An information processing system that manages information related to energy consumption, the information processing system comprising:

a first server that performs a process of storing first transaction data in a first distributed ledger, the first transaction data indicating that first value information is to be transferred from a first user to a second user, the first value information being obtained by evaluating, based on a first evaluation scale, a first energy consumption by the first user, the first transaction data including first computer executable program code for removing the confidential state of the first transaction data using first predetermined key information;

a second server that performs a process of storing second transaction data in a second distributed ledger, the second transaction data indicating that second value information is to be transferred from the second user to the first user, the second value information being obtained by converting, according to a conversion rule, the first energy consumption by the first user based on the first evaluation scale into a converted first energy consumption by the first user based on a second evaluation scale that is different from the first evaluation scale, the second transaction data including second computer executable program code for removing the confidential state of the second transaction data using second predetermined key information; and a third server that performs a process of storing third transaction data in a third distributed ledger, the third transaction data indicating that third value information is to be transferred from a third user to the second user, the third value information being obtained by evaluating, based on a third evaluation scale, a second energy consumption by the third user, the third evaluation scale being different from the first evaluation scale and the second evaluation scale wherein the second server further performs a process of storing fourth transaction data in the second distributed ledger, the fourth transaction data indicating that fourth value information is to be transferred from the second user to the third user, the fourth value information being obtained by converting, according to the conversion rule, the second energy consumption by the third user based on the third evaluation scale into to a converted second energy consumption by the third user based on the second evaluation scale, wherein the conversion rule is selected from a plurality of candidates for the conversion rule based on a voting process including the first user and the third user, and wherein, in the storing of the second transaction data, when the second transaction data is stored, (i) whether another item of transaction data has already been stored in the second distributed ledger is determined, the other item of transaction data indicating a transfer of the second value information of the first energy consumption to which the second transaction data to be stored is related, and (ii) when determining that the other item of transaction data has already been stored in the second distributed ledger, the second transaction data is prevented from being stored in the second distributed ledger, wherein the first server further performs a process of removing the confidential state of the first transaction data including:

storing fifth transaction data including third predetermined key information in the first distributed ledger;

determining whether the third predetermined key information included in the fifth transaction data matches the first predetermined key information included in the first transaction data; and when the third predetermined key information included in the fifth transaction data matches the first predetermined key information included in the first transaction data, executing the first computer executable program code included in the first transaction data for removing the confidential state of the first transaction data, and wherein the second server further performs a process of removing the confidential state of the second transaction data including:

storing sixth transaction data including fourth predetermined key information in the second distributed ledger;

determining whether the fourth predetermined key information included in the sixth transaction data matches the second predetermined key information included in the second transaction data; and when the fourth predetermined key information included in the sixth transaction data matches the second predetermined key information included in the second transaction data, executing the second computer executable program code included in the second transaction data for removing the confidential state of the second transaction data.

\* \* \* \* \*